Patented Dec. 24, 1946

2,413,197

UNITED STATES PATENT OFFICE 2,413,197

AQUEOUS DISPERSIONS OF VINYL-ACETATE POLYMERS

Joseph Edward Smith and William Alexander Drummond, Wilmington, Del., assignors to E. I. du Pont de Nemours & Company, Wilmington, Del., a corporation of Delaware No Drawing. Application August 26, 1943, Serial No. 500,072

7 Claims. (Cl. 260—32)

This invention relates to aqueous dispersions of vinyl-acetate polymers.

It is an object of this invention to prepare stable aqueous dispersions of the aforesaid polymers, suitable for use in the leather, textile or paper trade. A further object is to prepare stable, aqueous dispersions of the above type by a process of emulsion-polymerization. Other and further important objects of this invention will appear as the description proceeds.

These objects are accomplished according to our invention in the following manner:

Vinyl-acetate monomer containing a polymerization catalyst such as benzoyl peroxide and a relatively small quantity of a stabilizing agent, as more fully indicated below, is agitated with an aqueous solution of a composite dispersing agent comprising on the one hand a water-soluble, sulfate ester of a long-chain aliphatic alcohol or of a carboxylic acid ester of such an alcohol, and on the other hand a cationic surface-active agent, as defined below. The aqueous emulsion thus obtained is heated to a temperature between 50° C. and 80° C. to effect polymerization, yielding a stable, aqueous dispersion of finely divided vinyl-acetate polymer.

The preparation of commercially stable, organic, solvent-free aqueous dispersions of vinyl-acetate polymers is desirable in order that applications of this type resin can be made to textiles, paper, and leather from aqueous media. The obtaining, by the aid of surface-active agents, of solvent-free, aqueous, vinyl-acetate polymer dispersions which are stable in storage for 3 to 6 months or longer, has proved very difficult, particularly when a small average particle size is desired, such as two microns or lower. Extensive tests conducted by us with a wide variety of anionic and cationic surface-active agents have failed to develop a vinyl-acetate polymer dispersion in water of stability greater than a few days.

We have now found that solvent-free, aqueous dispersions of vinyl-acetate polymers of high stability can be obtained by a process of emulsion-polymerization, using a combination of a water-soluble, long-chain-alcohol sulfate ester, a cationic, surface-active agent selected from the group consisting of long-chain alkyl ammonium compounds, long-chain alkyl pyridinium halides and long-chain alkyl betaines, and a stabilizer. The latter may be a refined petroleum hydrocarbon, solid or liquid, boiling above 125° C. or an oxidized castor oil, or a mixture of the two. The resin dispersions thus obtained have a small particle size, lower than 2 microns, which combined with their high stability makes them unusually suitable for the treating and finishing of leather, textiles and paper.

Restating our invention in greater detail, our preferred procedure is as follows: Vinyl-acetate monomer, containing from about 0.5 to 1%, by weight, of benzoyl peroxide as a polymerization catalyst, is mixed with 3 to 10% (based on its own weight) of a refined petroleum hydrocarbon, such as a mineral oil, or with 3 to 10% of oxidized castor oil. The mixture of these ingredients is added with high-speed agitation to an aqueous solution containing about 1.8 to 7.2%, based on the weight of the oil phase, of the long-chain alcohol sulfate. Agitation and homogenization of the emulsion is continued until an average particle size of 2 microns or less is obtained. An aqueous solution containing about 0.37 to 2.25%, based on the weight of the oil phase, of a long-chain alkyl betaine or another cationic surface-active agent is added to the emulsion. The emulsion is heated to a temperature above 50° C. to induce polymerization of the vinyl acetate, yielding a dispersion of the polymer.

The fatty alcohol sulfate and the long-chain alkyl betaine or other cationic surface-active agent may be mixed together in solution before use, or the emulsion may be prepared by first emulsifying the oil phase in a solution of a fatty alcohol sulfate and adding the cationic surface-active agent at the end of the emulsification step. The latter procedure effects more rapidly reduction of particle size. In any event, it is essential that the long-chain alkyl cationic surface-active agent be present in the emulsion before polymerization occurs, in order to obtain the optimum stability.

We have found that the combination of the fatty alcohol sulfate with a cationic surface-active agent of the above types produces more stable emulsions than can be obtained with the fatty alcohol sulfate alone. However, the degree of stability obtained is not sufficient to meet many commercial requirements. We have found further that the addition of from 3 to 10% (based on the weight of the monomer) of a refined petroleum hydrocarbon, or from 3 to 10% of an oxidized castor oil, or of a mixture of the two, markedly improves stability to storage of the vinyl-acetate polymer dispersion obtained after aging. Vinyl acetate dispersions prepared with these added stabilizing agents are stable in storage for periods of 3 to 6 months or longer. The use of a mixture of a refined petroleum hydrocarbon and oxidized castor oil is particularly effective for the above purpose. The refined petroleum hydrocarbons which are satisfactory for use according to our invention include refined paraffin wax, petrolatum, and textile finishing oils. The refined petroleum hydrocarbons or oxidized castor oil can be added before carrying out the emulsification or during the emulsification process.

The stability of the vinyl acetate dispersions varies, depending on the quantities and ratios of the emulsifying agents used. Satisfactory emulsions, stable for several weeks, can be prepared using 1.8% to 3.6% of the fatty alcohol sulfate with 0.37% to 2.25% of the cationic surface-active agent, based on the weight of the oil phase. If very long stability is desired (5 months or over), the quantity of the cationic agent should best be limited to between 0.37% and 1.5%. If the quantity of sulfate ester is increased to 7.2%, the betaine or quaternary ammonium compound should not exceed about 0.75% on the weight of the resin phase. The use of still larger quantities of the fatty alcohol sulfate is not recommended. The concentration of resin in the dispersion is not critical; satisfactory emulsions containing from about 10% to about 40% resin can be prepared.

This invention is applicable not only to the preparation of vinyl acetate dispersions but also to the preparation of dispersions containing plasticizers for the vinyl acetate. Suitable plasticizers include high-boiling phthalate-, lactate-, tartrate-, glycolate-, adipate-, and phosphate-esters, and these may be used as modifiers for the polyvinyl acetate by incorporating them in the monomer before emulsification; particularly valuable plasticizers are butyl-phthalyl-butyl-glycolate, dibutoxy-ethyl-phthalate, dibutyl-phthalate, tricresyl-phosphate, and dimethyl-cyclohexyl-adipate.

The invention is illustrated by the following examples which, however, are not intended to limit the scope thereof. Parts mentioned are by weight.

*Example 1*

Thirty-three parts of vinyl-acetate monomer containing 0.33 part of benzoyl peroxide are mixed with 1.65 parts of 1225 mineral oil (Atlantic Refining Company) at room temperature. This is a blended mineral oil with a viscosity of 100 S. U. V. at 100° F. This mixture is added, while agitating, to 58.35 parts of an aqueous solution containing 1.2 parts of the sodium salt of sulfated oleyl acetate prepared according to U. S. Patent No. 2,082,576. Agitation is continued for 30 minutes to obtain an emulsion with an average particle size of 2 to 4 microns. The emulsion is circulated through a disc type homogenizing pump three times to reduce the particle size to an average of 0.5 to 2 microns. 0.25 part of cetyl betaine dissolved in 6.75 parts of water are added while continuing agitation. The emulsion is transferred through the disc pump into a kettle and heated for 16 hours at 65 to 70° C. to induce polymerization. The dispersion is filtered through cheesecloth to remove scum. A highly stable, aqueous, resin dispersion is obtained, which does not separate on storage for three months. On drying, this dispersion deposits a tough, flexible film of a clear, colorless resin.

*Example 2*

Thirty parts of vinyl-acetate monomer containing 0.3 part of benzoyl peroxide is mixed with 3 parts of di(butoxyethyl)phthalate and 1.65 parts of 1225 mineral oil (described in Example 1). This mixture is added, while agitating with a high-speed mixer to 65.35 parts of an aqueous solution containing 1.2 parts of the sodium salt of sulfated oleyl acetate (prepared according to U. S. Patent No. 2,082,576) and 0.25 part of cetyl betaine. The emulsion is homogenized by four passes through a Travis Disper mill. The emulsion is then heated in a water bath controlled at 65° C. for 16 hours to induce polymerization and to obtain an aqueous dispersion of the corresponding resin. The resin dispersion is filtered through cheesecloth to remove a relatively small amount of scum formed on the surface during polymerization. A highly stable aqueous resin dispersion is obtained, which does not separate on storage for three months, and deposits a more plastic film than that obtained in Example 1.

*Example 3*

The procedure is the same as in Example 2, except that the 0.25 part of cetyl betaine are replaced by an equal weight of dodecyl-trimethyl-ammonium bromide. The resulting suspension after polymerization has the same high stability and other good qualities as in Example 2.

In a similar manner other cationic surface-active agents may be used in lieu of cetyl betaine as part of the composite dispersing agent; for instance, dodecyl betaine, octadecyl-trimethyl-ammonium bromide, cetyl-ammonium chloride, etc. Likewise, the sodium salt of the sulfated oleyl acetate in the above examples may be replaced by other wetting agents of the "Gardinol" type (i. e. long-chain alcohol sulfates); for instance, the technical grades of sodium-dodecyl sulfate, sodium-cetyl sulfate, sodium-oleyl sulfate, etc.

*Example 4*

Blown castor oil (oxidized) is substituted for the mineral oil in Example 2. Similar results are obtained.

*Example 5*

1.65 parts of blown castor oil (oxidized) are used in addition to the mineral oil in Example 2 as an emulsification assistant and stabilizer. The ease of particle size reduction on agitation is much improved by the use of this mixture as shown by the fact that satisfactory dispersion stability is obtained without homogenization.

It will be understood that the above examples are merely illustrative, and that the details thereof may be varied widely within the skill of those engaged in this art.

The refined petroleum hydrocarbons useful as stabilizers for dispersions of this invention are those products having a boiling point above about 125° C. and include such products as:

Petrolatum
Crude scale wax
White mineral oil from a Pennsylvania crude, viscosity 40 S. U. V. at 100° F.
1225 mineral oil (Atlantic Refining Co.), blended mineral oil with a viscosity of 100 S. U. V. at 100° F.
1268 textile oil (Atlantic Refining Co.), blended mineral oil with a viscosity of 100 S. U. V. at 100° F.

The crude scale wax and 40 S. U. V. at 100° F. white mineral oil are preponderantly paraffinic hydrocarbons; the blended oils are mixtures of paraffinic and cycloaliphatic hydrocarbons; the petrolatum is composed largely of cycloaliphatic hydrocarbons.

Suitable fatty alcohol sulfate esters applicable in this invention include the water-soluble alkali metal, alkaline earth, ammonium and amine salts of products prepared by sulfating alcohols with a chain length of $C_{12}$ to $C_{18}$ carbon atoms, as well as the analogous water-soluble salts of sulfated oleyl acetate. The former group may be represented by the general formula R—O—SO$_3$M, wherein R is an alkyl radical having 12 to 18 carbon atoms, and M is a water-solubilizing cationic radical, while the analogous water-soluble salts of sulfated oleyl acetate may be represented by the general formula

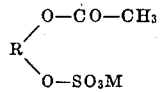

wherein R and M have the same significance as above. The entire group of sulfated esters may therefore be defined as the water-soluble salts of aliphatic sulfuric acid esters of the general formula X—$C_nH_{2n}$—O—SO$_3$H, wherein X stands for hydrogen or an acetate radical while $n$ is an integer having one of the values 12 to 18 inclusive.

Suitable alkyl betaines include products with a chain length of $C_{12}$ to $C_{18}$ carbon atoms. The preparation of such products is described in U. S. Patent No. 2,129,264.

Suitable cationic surface-active agents of the ammonium type include long-chain alkyl ammonium halides (primary, secondary, tertiary or quaternary) having a chain length of $C_{12}$ to $C_{18}$ carbon atoms, as well as long-chain-alkyl pyridinium halides.

The polymerization temperature has been indicated at 65° C. to 70° C. in the above examples. Other temperatures between 50° C. and the boiling point of vinyl acetate may likewise be employed. Furthermore, the polymerization may be effected under pressure, in which case temperatures of 100° C. or higher may be resorted to.

This invention has the advantage that it enables the preparation, by the aid of surface-active agents, of low-particle-size, highly stable, solvent-free, aqueous dispersions of vinyl-acetate polymers, which because of their high stability are particularly of value and have wide utility as finishes for leather, textiles, and paper.

We claim:

1. A disperse aqueous system comprising in uniform distribution a vinyl-acetate polymer in fine state of subdivision with particle size averaging below 2 microns, a polymerization catalyst for vinyl acetate, a stabilizer comprising a petroleum hydrocarbon boiling above 125° C., a wetting agent being a sulfated aliphatic alcohol and a cationic surface-active agent, the said stabilizer being present in quantity of between 3 and 10% by weight, the wetting agent being present in quantity of between 1.8 and 7.2% by weight, and the cationic surface-active agent being present in quantity of between 0.37 and 2.25% by weight, all said percentages being based on the weight of the dispersed polymer.

2. A disperse system as in claim 1, comprising further a plasticizer for said vinyl-acetate polymer.

3. The process of preparing a stable aqueous suspension of a vinyl-acetate polymer, which comprises emulsifying vinyl acetate monomer jointly with a polymerization catalyst and a stabilizer in an aqueous medium containing a composite dispersing agent as defined below; said stabilizer comprising a petroleum hydrocarbon boiling above 125° C. and being present in quantity of 3 and 10% by weight, and said composite dispersing agent comprising on the one hand a sulfate ester of an aliphatic alcohol having a chain length of 12 to 18 carbon atoms and being present in quantity of 1.8 to 7.2% by weight, and on the other hand a cationic surface-active agent in quantity of 0.37 to 2.25% by weight, all said percentages being based on the weight of the vinyl acetate monomer selected for emulsification; and heating the emulsion thus produced to its polymerization temperature whereby to polymerize the monomer in situ producing a finely divided, uniformly suspended vinyl-acetate resin.

4. A stable, disperse aqueous system comprising in uniform distribution a vinyl-acetate polymer in proportion of 10 to 40% by weight of the entire system, white mineral oil in proportion of 3 to 10% by weight of the polymer, the sodium salt of sulfated oleyl acetate in proportion of 1.8 to 3.6% by weight of the polymer, and dodecyl-trimethyl-ammonium bromide in proportion of 0.37 to 1.5% by weight of the polymer.

5. An aqueous dispersion of a vinyl-acetate polymer comprising, beside said polymer, a water-soluble sulfate ester of an aliphatic alcohol having a chain-length of 12 to 18 carbon atoms, an alkyl betaine having a chain-length of 12 to 18 carbon atoms and having surface-active properties, and a stabilizer comprising petroleum hydrocarbons boiling above 125° C., said stabilizer being present in quantity of between 3 and 10% by weight, said water-soluble sulfate ester being present in quantity of between 1.8 and 7.2% by weight, and the betaine compound being present in quantity of between 0.37 and 2.25% by weight, all said percentages being based on the weight of the dispersed polymer.

6. An aqueous dispersion of a vinyl-acetate polymer comprising, beside said polymer, a water-soluble sulfate ester of an aliphatic alcohol having a chain-length of 12 to 18 carbon atoms, an alkyl ammonium compound having a chain-length of 12 to 18 carbon atoms and having surface-active properties, and a stabilizer comprising a petroleum hydrocarbon fraction boiling above 125° C., said stabilizer being present in quantity of between 3 and 10% by weight, said water-soluble sulfate ester being present in quantity of between 1.8 and 7.2% by weight, and said ammonium compound being present in quantity of between 0.37 and 2.25% by weight, all said percentages being based on the weight of the dispersed polymer.

7. A stable, disperse aqueous system comprising in uniform distribution a vinyl-acetate polymer in proportion of 10 to 40% by weight of the entire system, white mineral oil in proportion of 3 to 10% by weight of the polymer, the sodium salt of sulfated oleyl acetate in proportion of 1.8 to 3.6% by weight of the polymer, and cetyl betaine in proportion of 0.37 to 1.5% by weight of the polymer.

JOSEPH EDWARD SMITH.
WILLIAM ALEXANDER DRUMMOND.